US012565294B2

(12) United States Patent
Housman et al.

(10) Patent No.: US 12,565,294 B2
(45) Date of Patent: *Mar. 3, 2026

(54) ADJUSTABLE ELECTRONICS MOUNTING PLATFORM AND RELATED METHODS

(71) Applicant: ISLA MAPPING LLC, Longwood, FL (US)

(72) Inventors: Glenn Housman, Longwood, FL (US); Christopher D. Wolfe, Tampa, FL (US)

(73) Assignee: ISLA MAPPING LLC, Longwood, FL (US)

( * ) Notice: Subject to any disclaimer, the term of this patent is extended or adjusted under 35 U.S.C. 154(b) by 755 days.

This patent is subject to a terminal disclaimer.

(21) Appl. No.: 17/933,221

(22) Filed: Sep. 19, 2022

(65) Prior Publication Data

US 2023/0011455 A1     Jan. 12, 2023

Related U.S. Application Data

(63) Continuation of application No. 17/002,932, filed on Aug. 26, 2020, now Pat. No. 11,447,215.

(Continued)

(51) Int. Cl.
B63B 49/00          (2006.01)
B63B 17/00          (2006.01)
(Continued)

(52) U.S. Cl.
CPC .............. B63B 49/00 (2013.01); B63B 17/00 (2013.01); F16M 11/10 (2013.01); F16M 11/24 (2013.01); F16M 11/38 (2013.01); F16M 13/02 (2013.01)

(58) Field of Classification Search
CPC ......... B63B 49/00; B63B 17/00; B63B 29/12; F16M 11/10; F16M 11/24; F16M 11/38;
(Continued)

(56) References Cited

U.S. PATENT DOCUMENTS

| | | | |
|---|---|---|---|
| 5,797,666 A | 8/1998 | Park | |
| 5,865,403 A | 2/1999 | Covell | |

(Continued)

FOREIGN PATENT DOCUMENTS

| | | |
|---|---|---|
| CN | 102697288 | 10/2014 |
| CN | 106617688 | 5/2017 |

(Continued)

*Primary Examiner* — Andrew Polay

(74) *Attorney, Agent, or Firm* — Allen, Dyer, Doppelt + Gilchrist, PA

(57)          ABSTRACT

A boat console may include a boat console body to be mounted within a boat defining a boat console panel having a mounting hole therein. The console may further include a marine electronics unit having a screen, and an electronics mounting platform including a base connected to a back side of the boat console panel and aligned with the mounting hole, an actuator connected to the base, a mounting plate having a first side connected to the actuator, and a second side opposite the first side, and at least one pivot mount connected to the second side of the mounting plate and to the marine electronics unit. The actuator may be configured to move the mounting plate between a stowed position and an extended position in which the marine electronics unit is pivotable to orient the screen at different viewing angles.

15 Claims, 12 Drawing Sheets

Related U.S. Application Data

(60) Provisional application No. 62/891,478, filed on Aug. 26, 2019.

(51) Int. Cl.
    | | |
    |---|---|
    | *F16M 11/10* | (2006.01) |
    | *F16M 11/24* | (2006.01) |
    | *F16M 11/38* | (2006.01) |
    | *F16M 13/02* | (2006.01) |

(58) Field of Classification Search
    CPC . F16M 13/02; F16M 11/18; B60R 2011/0092
    See application file for complete search history.

(56) References Cited

U.S. PATENT DOCUMENTS

| | | | |
|---|---|---|---|
| 6,179,253 | B1 | 1/2001 | Cotton |
| 6,570,628 | B1 | 5/2003 | Hirano |
| 6,733,094 | B1 | 5/2004 | Chang |
| 6,902,243 | B2 | 6/2005 | Bober |
| 7,959,226 | B2 | 6/2011 | Hattori et al. |
| 8,430,051 | B1 | 4/2013 | Allison |
| 8,833,538 | B2 | 9/2014 | Oh |
| 9,481,403 | B1 | 11/2016 | Johnson |
| 10,293,900 | B1* | 5/2019 | Leonard ................. F16M 11/26 |
| 10,625,688 | B2 | 4/2020 | Adamson, Sr. et al. |
| 11,447,215 | B2* | 9/2022 | Housman ............... F16M 11/18 |
| 2002/0101139 | A1 | 8/2002 | Lee |
| 2005/0001105 | A1 | 1/2005 | Matsuda et al. |
| 2006/0017356 | A1 | 1/2006 | Hoss |
| 2006/0076860 | A1 | 4/2006 | Hoss |
| 2006/0125360 | A1 | 6/2006 | Kim et al. |
| 2006/0180403 | A1 | 8/2006 | Hanlon |
| 2006/0288354 | A1 | 12/2006 | Ito |
| 2007/0125917 | A1 | 6/2007 | Oh et al. |
| 2007/0170325 | A1 | 7/2007 | Ryu |
| 2007/0170327 | A1* | 7/2007 | Hayes .................... B63B 17/00 248/286.1 |
| 2007/0284494 | A1 | 12/2007 | Choi et al. |
| 2009/0008974 | A1 | 1/2009 | Hattori et al. |
| 2011/0186099 | A1 | 8/2011 | Martinez |
| 2019/0135192 | A1 | 5/2019 | Adamson, Sr. et al. |

FOREIGN PATENT DOCUMENTS

| | | |
|---|---|---|
| CN | 206486239 | 9/2017 |
| CN | 207380609 | 5/2018 |

* cited by examiner

ADJUSTABLE ELECTRONICS MOUNTING PLATFORM AND RELATED METHODS

CROSS-REFERENCE TO RELATED APPLICATIONS

This application claims the benefit of U.S. application Ser. No. 17/002,932 filed Aug. 26, 2020 which claims the benefit of U.S. Provisional Application No. 62/891,478 filed Aug. 26, 2019, which are hereby incorporated herein in their entireties by reference.

TECHNICAL FIELD

The present invention relates to the field of console-mounted electronic units and, more particularly, to mounting platforms for electronic units and related methods.

BACKGROUND

Electronic units or devices are widely utilized in vehicles, vessels, planes, etc., to convey information to the operator. In the case of boats, various electronic units are typically mounted to the console of the boat to provide navigation or other information to the driver. Such units may include chartplotters, sonar units, fish finders, weather display units, radar display units, etc. Moreover, other electronic devices such as VHF radios, stereos, etc., may also similarly be mounted to boat consoles.

In the case of many marine electronic units such as chartplotters, these devices are typically mounted to the console in one of two ways. For units twelve inches or under, an adjustable gimbal mounting bracket is affixed to the console with screws or suction cups, and screw knobs attach the unit to the gimbal mounting bracket. For units nine inches or larger, it is very common to cut a hole in the console and flush mount the electronics display to the front or outer surface of the console. However, smaller units may also be flush mounted to a console as well.

Despite the existence of such mounting configurations, additional positional flexibility for improved ergonomics, visibility, and functionality in electronic unit mounting, such as for boats or vessels, is desirable in some applications. To date this has been unachievable, particularly so with respect to flush mounted devices.

SUMMARY

A boat console may include a boat console body to be mounted within a boat defining a boat console panel having a mounting hole therein. The console may further include a marine electronics unit having a screen, and an electronics mounting platform including a base connected to a back side of the boat console panel and aligned with the mounting hole, an actuator connected to the base, a mounting plate having a first side connected to the actuator, and a second side opposite the first side, and at least one pivot mount connected to the second side of the mounting plate and to the marine electronics unit. The actuator may be configured to move the mounting plate between a stowed position where the marine electronics unit is recessed within the mounting hole with the screen viewable at a fixed viewing angle, and an extended position in which the marine electronics unit is spaced apart from the front side of the boat console panel and pivotable using the at least one pivot mount to orient the screen at different viewing angles.

In an example embodiment, the base may comprise an enclosure including a bottom and a plurality of sidewalls extending from the bottom to be connected to the back side of the boat console panel around the mounting hole. In some example implementations, the base may comprise a bearing plate, and the boat console may further include a plurality of standoffs configured to connect the bearing plate to the back side of the boat console panel around the mounting hole. More particularly, the bearing plate may comprise a lower bearing plate, and the electronics mounting platform may further include an upper bearing plate connected between the back side of the boat console panel and the plurality of standoffs in some implementations.

By way of example, the at least one pivot mount may comprise a pair of spaced apart gimbal arms. In accordance with another example, the at least one pivot mount may comprise a VESA mount.

In another example implementation, the actuator may comprise at least one lead screw connected between the base and a lead screw nut carried by the mounting plate, and a motor carried by the base and configured to rotate the at least one lead screw to move the mounting plate between the stowed position and the extended position. More particularly, the at least one lead screw may comprise a plurality of spaced apart lead screws connected between the base and respective lead screw nuts carried by the mounting plate, the electronics mounting platform may further include a belt connected between the motor and the lead screws, and the motor may be configured to turn the belt to simultaneously rotate the lead screws, for example.

In still another example embodiment, the actuator may comprise at least one lead screw connected between the mounting plate and a lead screw nut carried by the base, and a motor carried by the mounting plate configured to rotate the at least one lead screw to move the mounting plate between the stowed position and the extended position. In another example implementation, the actuator may comprise a scissor lift connected between the base and the mounting plate.

DETAILED DESCRIPTION

The present disclosure is provided with reference to the accompanying drawings, in which various embodiments are shown. However, other embodiments in many different forms may be used, and the disclosure should not be construed as limited to the particular embodiments set forth herein. Rather, these embodiments are provided so that this disclosure will be thorough and complete, and will fully convey the claim scope to those skilled in the art. Like numbers refer to like elements throughout, and prime notation is used to indicate similar elements in alternative embodiments.

Generally speaking, the present disclosure relates to motorized electronic mounting platforms for vehicle consoles, such as for marine electronic units to be mounted on boating consoles. It should be noted, however, that while the following examples are shown and described with gear motor actuators, in some embodiments other actuators may be used, such as a linear actuator, a hand actuator (e.g., hand crank), etc., to achieve a similar function.

Figure 1:
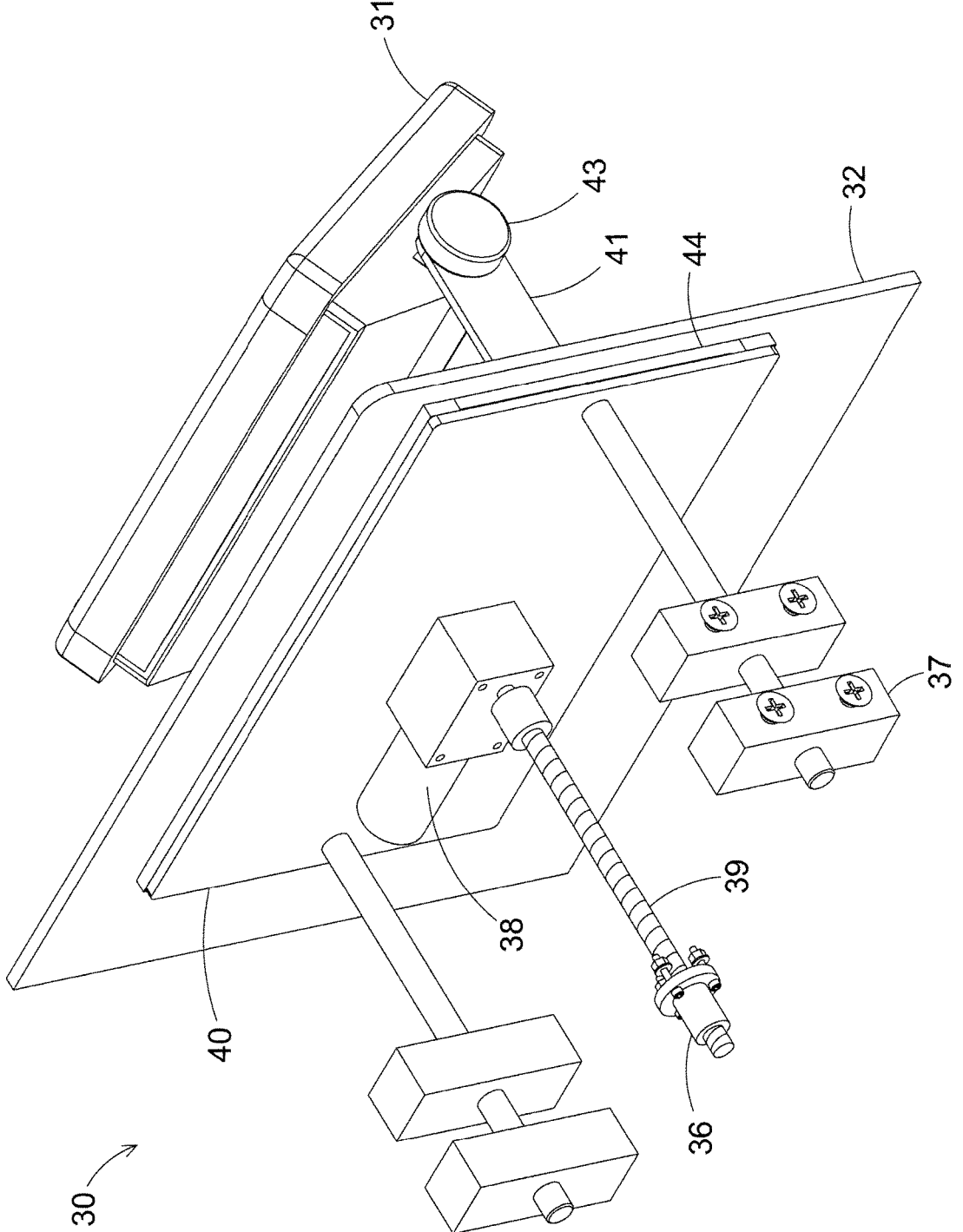
FIG. 1 is a perspective view of an adjustable electronics mounting platform in accordance with an example embodiment utilizing a lead screw drive configuration that is shown from the rear with the platform in an extended position.
Figure 2:
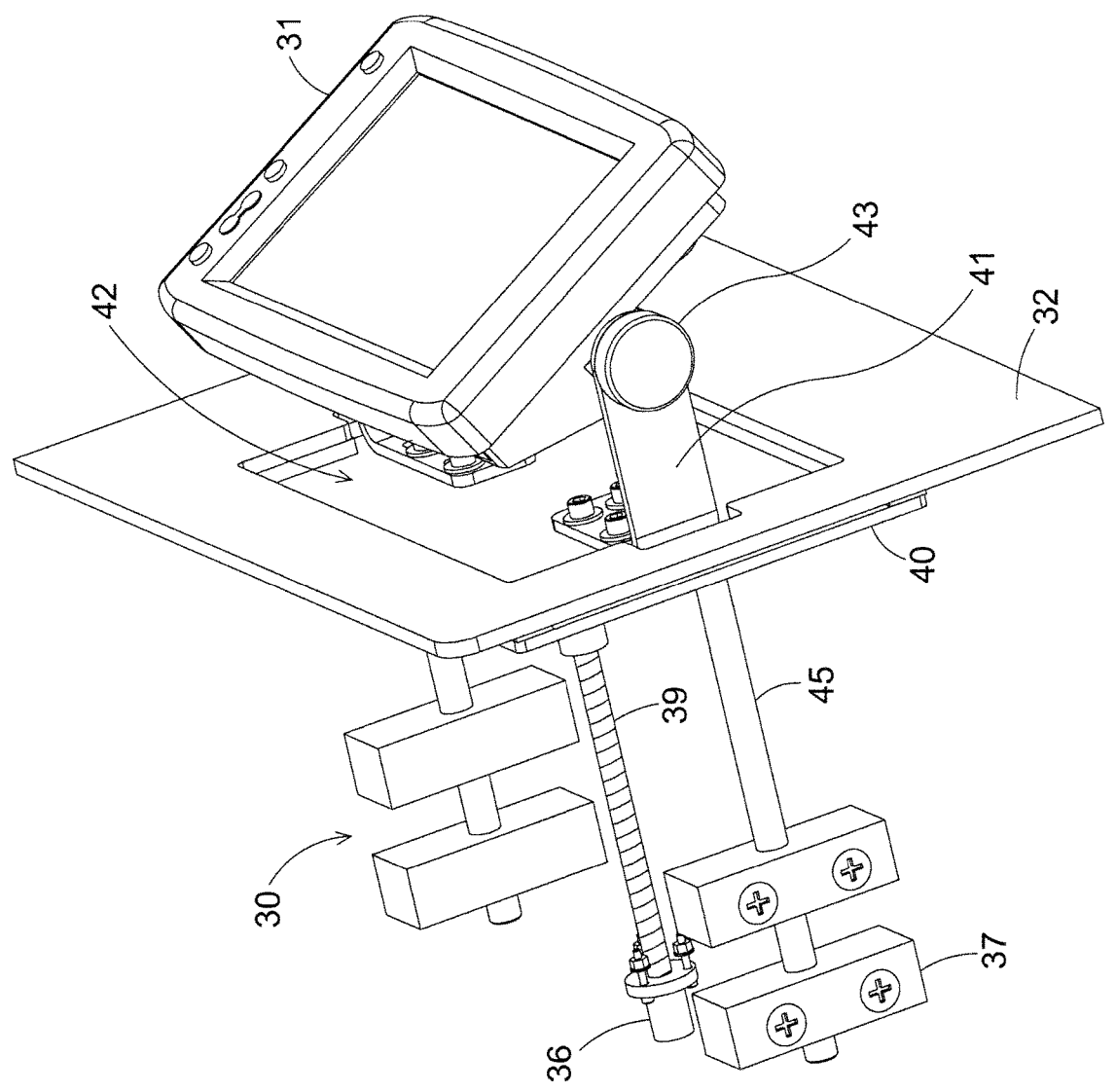
FIG. 2 is a perspective view of the adjustable electronics mounting platform of FIG. 1 shown from the front in the extended position.
Figure 3:
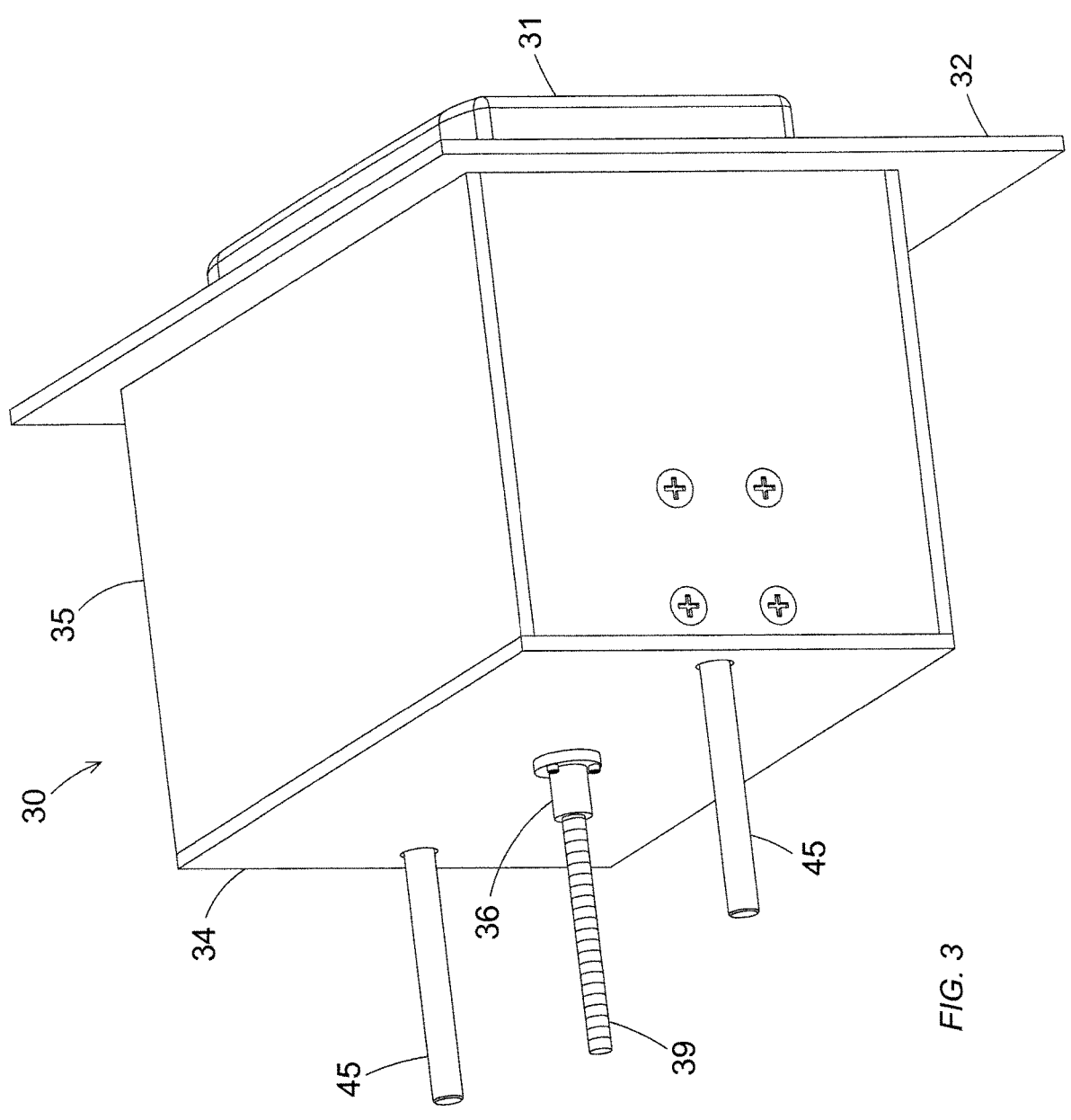
FIG. 3 is a perspective view of the adjustable electronics mounting platform of FIG. 1 with an enclosure covering certain components thereof with the platform in a stowed/flush position.

Referring now to FIGS. 1-3, in accordance with a first embodiment of the adjustable electronics mounting platform 30, a lead-screw/rail lift configuration is shown which advantageously provides for lifting of an attached electronic device 31 from a flush or stowed position (FIG. 3), relative to a front side of a boat console panel 32, to an extended position (FIGS. 1 and 2) where it is spaced apart from the front side of the boat console panel and can be rotated or pivoted as shown. In the illustrated example, the attached electronics unit 31 is a chartplotter, but it will be appreciated by those skilled in the art that the various mounting platforms set forth herein may be used with numerous different types of electronic devices, including chartplotters, sonar/fish finder units, radar units, radios, etc. Moreover, it should be noted that while the mounting platforms described herein are particularly advantageous for marine (boat) applications, they may also be used in other applications as well (aircraft, automobiles, etc.) where electronic devices are to be mounted to a console or dashboard panel. However, for the following examples, a marine (boat) application with a chartplotter installation will be used for convenience of reference.

As seen in FIG. 3, in the present example an enclosure or box 33 surrounds the mounting platform 30 on the inside/back side of the boat console panel 32. The enclosure 33 illustratively includes a bottom 34 and a plurality of sidewalls 35 extending from the bottom which are connected to the back side of the boat console panel 32 surrounding a mounting hole 42 therein. The enclosure 33 advantageously acts as a protective cover and as a mounting frame for the lead screw nut 36 and the guide bushings 37 carried on rails

45 as shown. By way of example, the enclosure 33 may be made of metal, or in some embodiments this could be a plastic (e.g., injection molded) piece that drops into the boat console panel 32 and is attached to the front side of the console panel.

The illustrated lead-screw/rail lift configuration operates as follows. An electric gear motor 38 rotates a lead screw 39 that is threaded through the lead screw nut 36. As the motor 38 rotates, the lead screw 39 exerts a force against the bottom or floor 34 of the enclosure 33. The motor 38 is connected to a back side of a mounting plate 40, and a pair of adjustable gimbal mounting brackets or arms 41 are connected to a front side of the mounting plate. The chartplotter 31 is pivotally mounted to the gimbal arms 41 with knobs 43. As the lead screw 39 exerts force against the bottom 34 of the enclosure 33, the mount plate 40 and, accordingly, the gimbal arms 41, are then pushed outward, resulting in the chartplotter 31 travelling away from the boat console panel 32 to the extended position. The gear motor 38 may then be reversed to return the chartplotter 31 to its stowed, flush position. The gear motor 38 may be actuated by a button or other type of switch, which may be mounted to the console or can be wireless (e.g., on a fob). In some embodiments, the mounting plate 40 may be automatically moved between the flush mount and extended positions, or it may be manually stopped at intermediate positions between the flush mount and extended positions.

The gimbal arms 41 are attached to the front side of the mount plate 40, and the chartplotter 31 is constrained to the gimbal arms using adjustment knobs 43. The adjustment knobs 43 can be loosened to allow the chartplotter 31 to be rotationally or pivotally adjusted to a desired viewing angle as shown. The gimbal arms 41 are slotted at their base and are side-to-side adjustable. The gimbal arms 41 are free to move side-to-side until the screws at their base on the mounting plate 40 are securely tightened. This may advantageously accommodate various chartplotters 31 of different widths. The gimbal arms 41 may also be adjustable along the direction of lift in some embodiments.

As an option, a gasket or seal strips 44, etc., can be used under the console or carried by the mounting plate 40 so that when the mounting plate is fully lifted the gasket is pressed to form both a water-tight interface and a more solid, stiff mounting surface for the gimbal arms 41. The chartplotter 31 may also optionally have a seal/gasket under its interface surface to form a seal with the front surface the boat console panel 32 when the chartplotter is in the stowed/flush position.

FIG. 3 shows the mounting platform 30 with the enclosure/frame 33 in place. Sidewalls 35 of the enclosure 33 mount to the back side (underside) of the console 32 using screws or other suitable attachment device(s). In the illustrated view, the chartplotter 31 is shown in its stowed, flush position. The lead screw 39 and rails 45 protrude from the bottom 34 of the enclosure 33 in this position. An appropriate clearance may be provided below/behind the enclosure for these components when the chartplotter 31 is stowed position. Moreover, it should also be noted that different sizes of enclosures 33 (as well as other components of the mounting platform 30) may be used to accommodate different sizes of chartplotters 31, as larger units will need to travel a longer distance between the flush and fully extended positions than smaller units. That is, larger units will need to be further away from the front surface of the boat console panel 32 for pivoting than a smaller unit, as will be appreciated by those skilled in the art.

Figure 4:
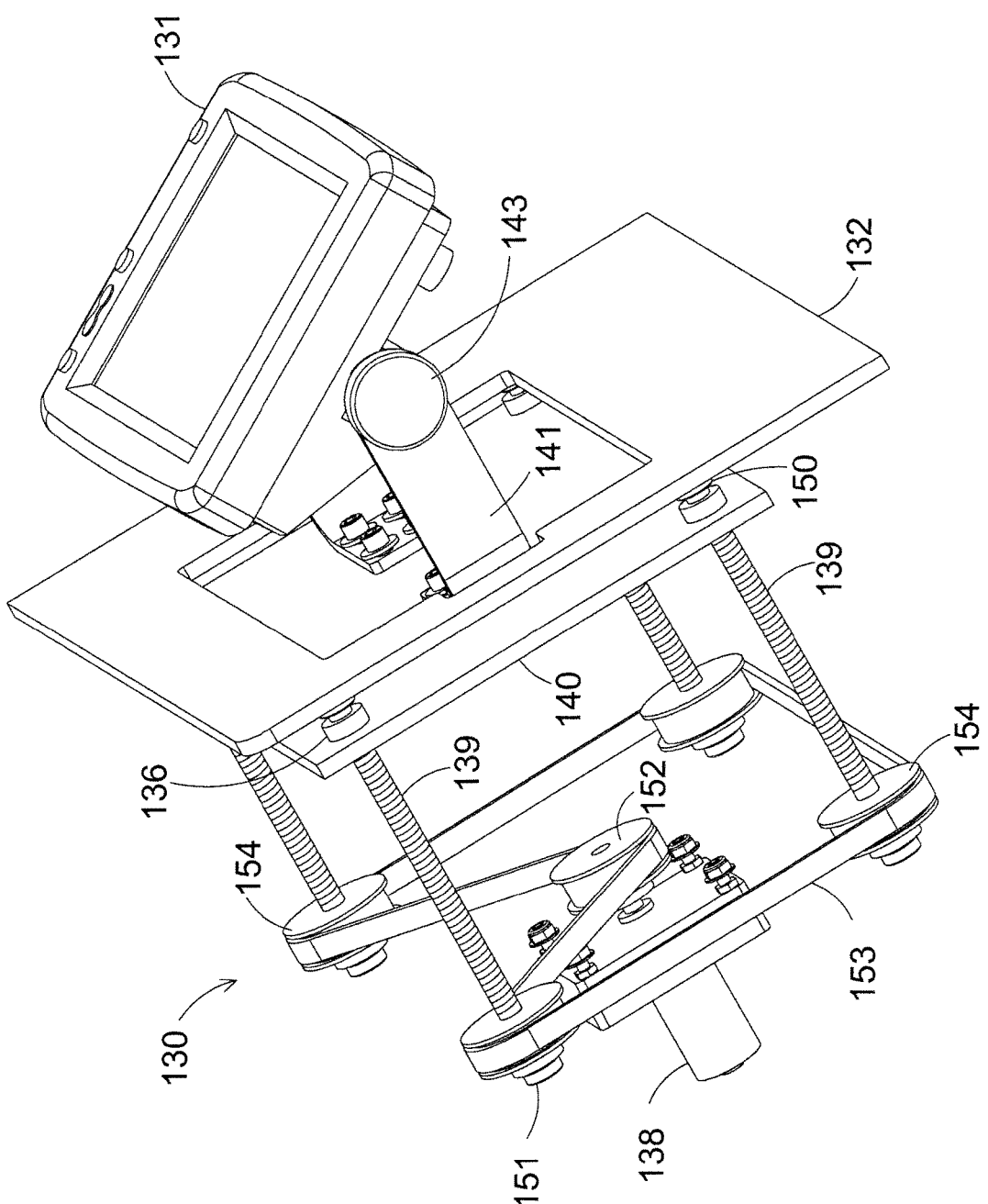
FIG. 4 is a perspective view of an adjustable electronics mounting platform in accordance with another example embodiment using a belt-driven lead screw configuration and shown in an extended position.
Figure 5:
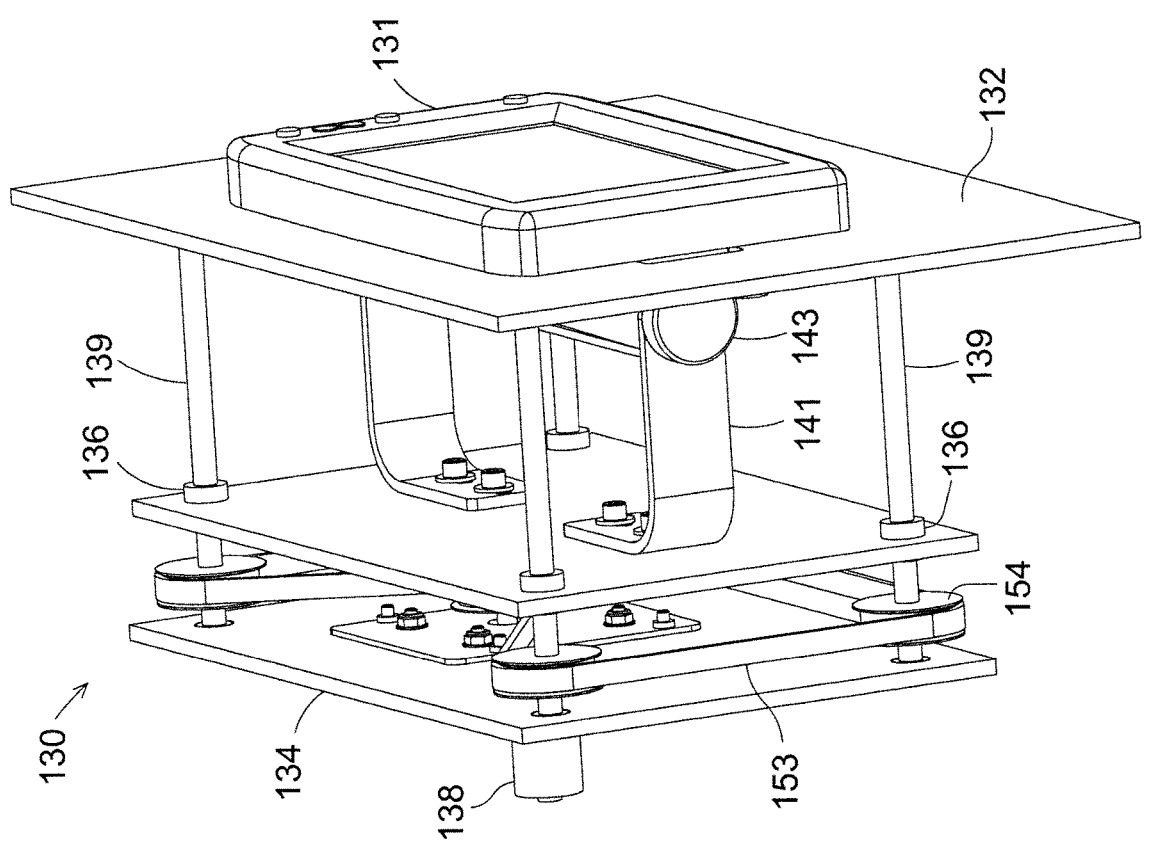
FIG. 5 is a perspective view of the adjustable electronics mounting platform of FIG. 4 in a stowed/flush position.

Turning to FIGS. 4 and 5, another example embodiment of a belt-driven, four-lead-screw lift mounting platform 130 configuration is now described. As similarly discussed above, the mounting platform 130 also is configured to lift a chartplotter 131 (or other electronic devices) from a flush position (FIG. 5), relative to the front surface of the boat console panel 132, to an extended position (FIG. 4) where it can be rotated or pivoted as shown. Although not shown, an enclosure similar to the one shown in FIG. 3 may be used on the back side of the mounting platform 130 (i.e., inside the boat console) to surround the mounting platform. Again, the enclosure would act as a protective cover and as a mounting frame for the gear motor 138, upper bearings 150 and lower bearings 151 carried by the base 134 of the enclosure.

The belt-driven, four-lead-screw lift configuration operates as follows. The gear motor 138 rotates a pulley 152. The pulley 152 moves a belt 153 that interfaces with four other pulleys 154 that are each fastened to a respective lead screw 139. As the motor 138 rotates, the four lead screws rotate in four lead screw nuts 136 and exert a force on the mount plate 140 lifting it or lowering it, depending on direction of rotation of the gear motor. Gimbal arms 141 are attached to the mount plate 140, and the chartplotter 131 is constrained to the gimbal arms using adjustment knobs 143. Once the chartplotter 131 is extended, the adjustment knobs 143 can be loosened to allow the chartplotter to be rotationally adjusted or pivoted to a desired viewing angle as shown.

The gimbal arms 141 are slotted at their base and are side-to-side adjustable. That is, the gimbal arms 141 are free to move side-to-side until the screws are securely tightened at their base. Again, this accommodates various chartplotter 131 brands or configurations with different shapes and widths. The gimbal arms 141 may also be adjustable along the direction of lift, if desired. Although not shown, seals or gaskets may be incorporated between the mounting plate 140 and the back of the boat console panel 132, and/or between the chartplotter 131 and the front of the boat console panel as described above, if desired.

Figure 6:
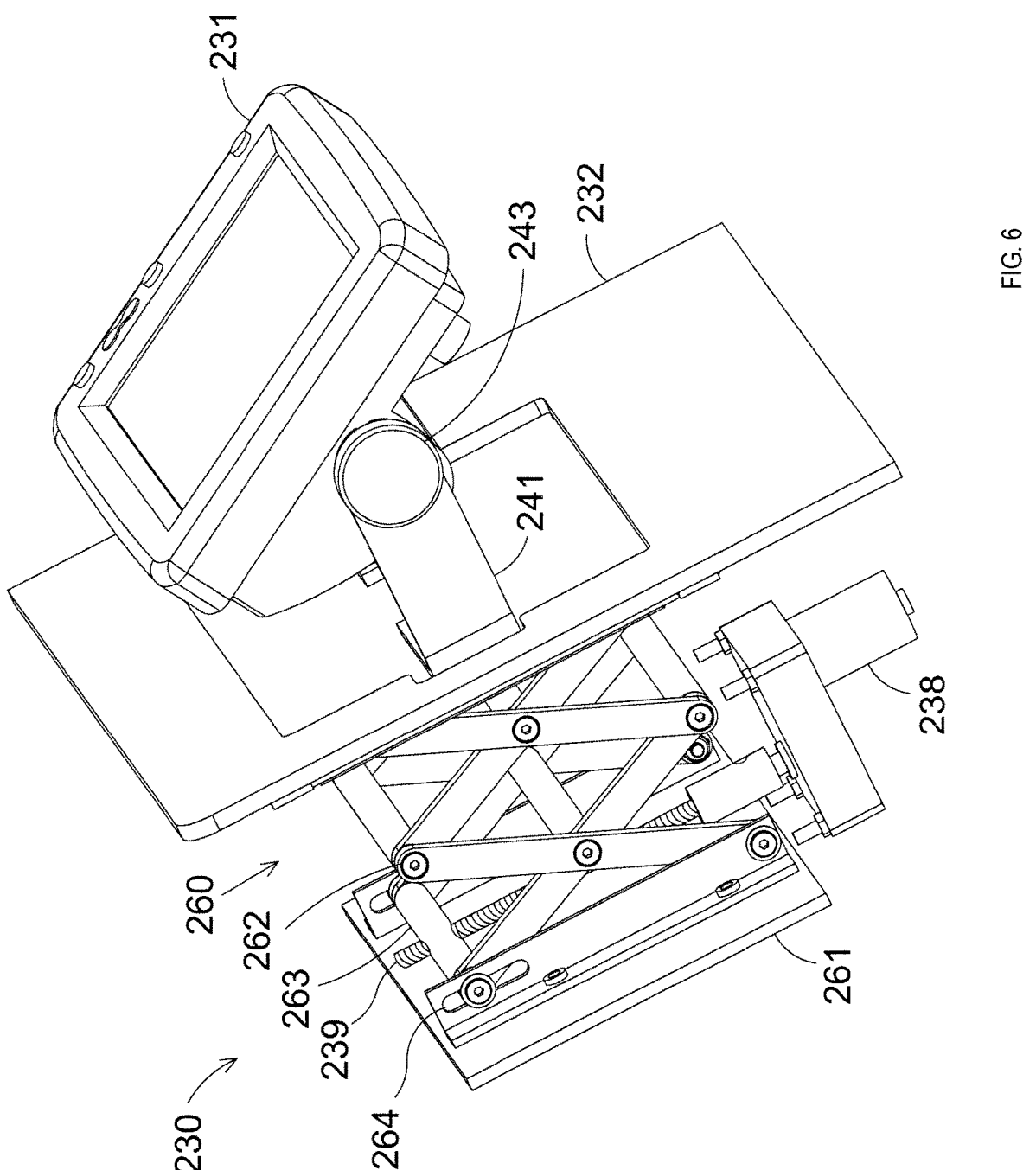
FIG. 6 is a perspective view of an adjustable electronics mounting platform in accordance with still another example embodiment using a scissor-lift drive configuration and shown in an extended position from the front.
Figure 7:
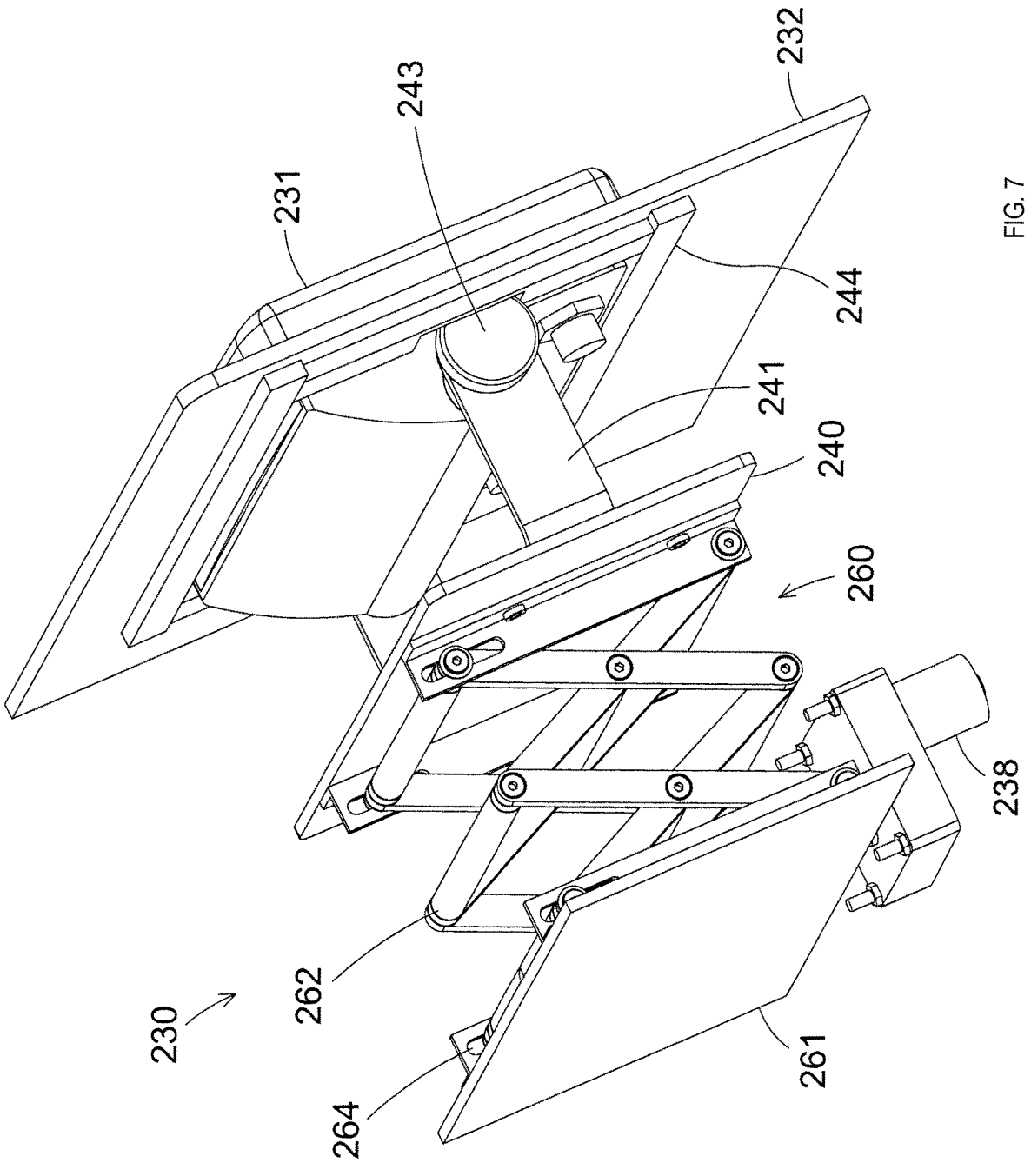
FIG. 7 is a perspective view of the adjustable electronics mounting platform of FIG. 6 shown in an extended position from the rear.
Figure 8:
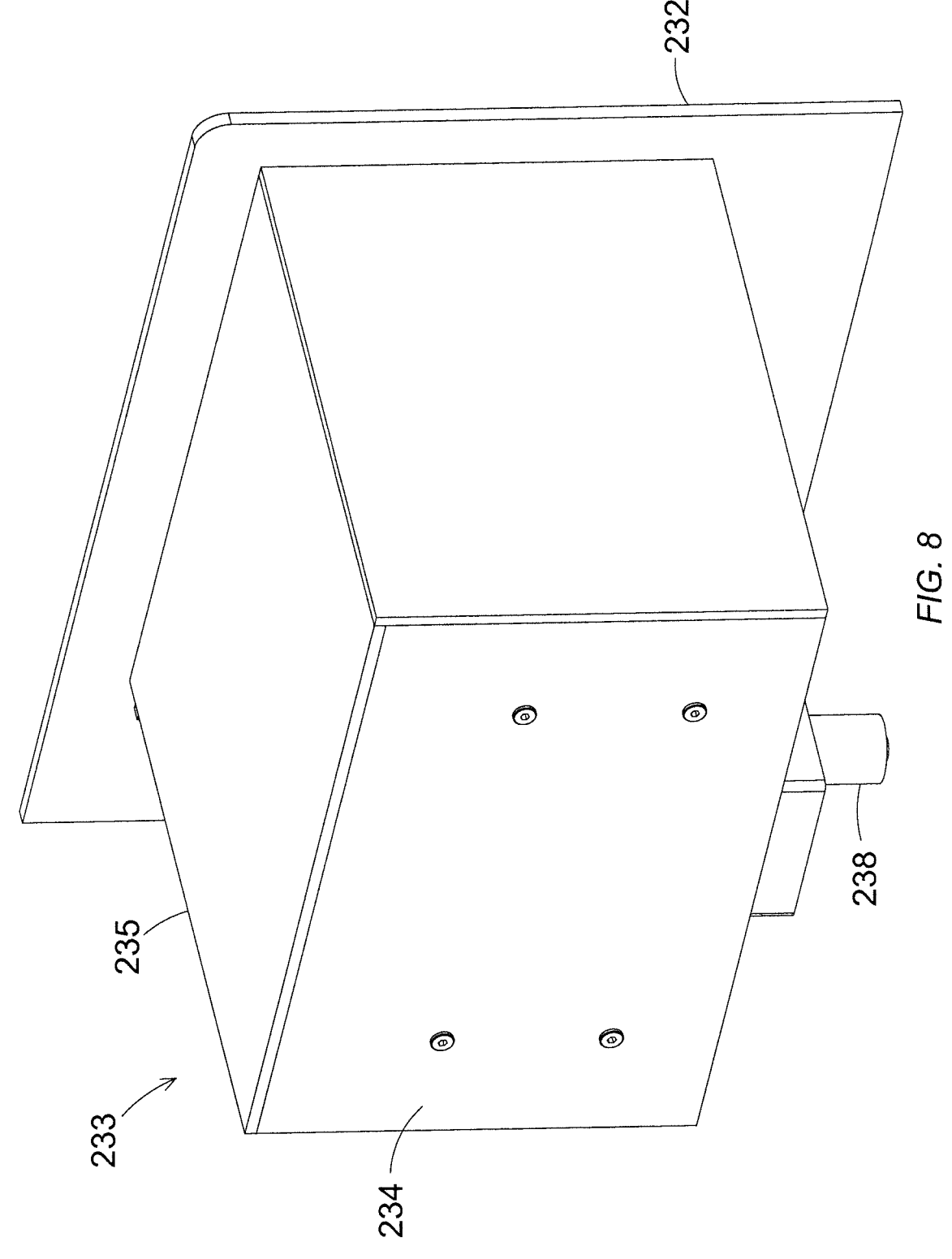
FIG. 8 is a perspective view of the adjustable electronics mounting platform of FIG. 6 with an enclosure covering certain components thereof.
Figure 9:
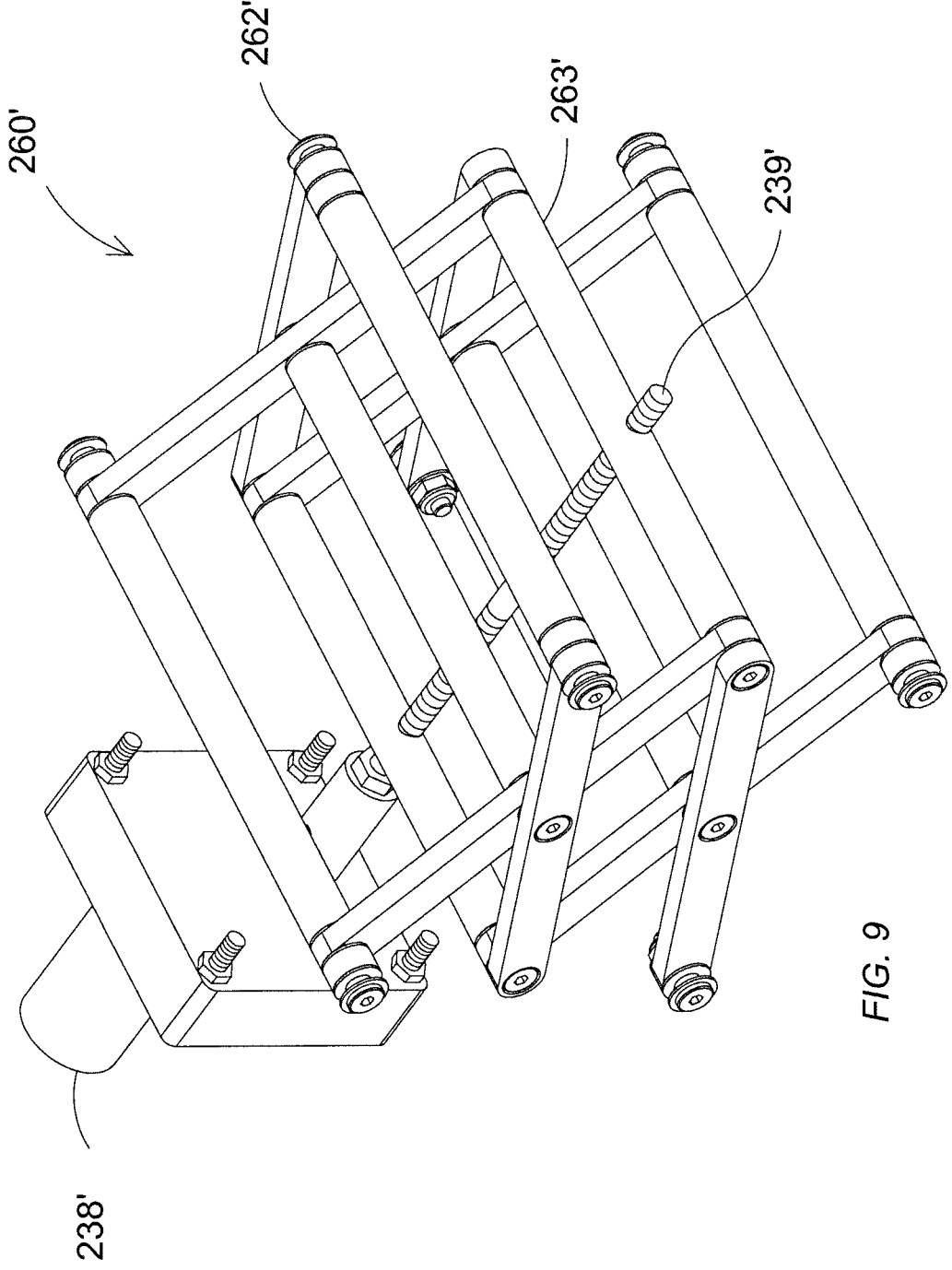
FIG. 9 is a perspective view of an alternative arrangement of a scissor-lift drive configuration which may be used with the mounting platform of FIG. 6.

Referring now to FIGS. 6-9, still another example electronics mounting platform 230 having a scissor lift 260 is now described. Again, the scissor lift mounting platform 230 lifts the chartplotter 231 from a flush position (see FIG. 7), relative to the front surface of the boat console panel 232, to an extended position (see FIG. 6) where it can be rotated or pivoted as shown. Here again, an enclosure 233 (which includes a base 234 and sidewalls 235) may surround the mounting platform 230 within the console, as shown in FIG. 8. The enclosure 233 acts as a protective cover, and the sidewalls 235 act as a mounting frame for the gear motor 238 and the base 261 and frame members 262 of the scissor lift 260.

The scissor-lift configuration operates as follows. The gear motor 238 rotates a threaded rod 239 (also known as a lead screw) that is threaded through the cross bar 263 as shown. As the motor 238 rotates, the threaded rod 239 exerts a pulling force on the cross bar 263. The cross bar 263 is then pulled along a slot 264 on each side of the scissor lift 260, resulting in an expansion of the frame members 262.

FIG. 7 shows the underside perspective of the scissor lift mechanism 260 (as it would be seen inside the console). A mount plate 240 is attached to the upper frame members 262 of the mechanism 260 and is lifted during operation. Gimbal arms 241 are attached to the mount plate 240, and the chartplotter 231 is constrained to the gimbal arms using adjustment knobs 243. The adjustment knobs 243 can be loosened to allow the chartplotter to be rotationally adjusted or pivoted up or down to a desired viewing angle as shown in FIG. 6. As discussed above, the gimbal arms 241 are side-to-side adjustable, and slotted at the point of attachment to the mount plate. Screws are used to attach the gimbal arms 241 to the mount plate 240. The gimbal arms 241 are free to move side-to-side until the screws are securely tightened. This may advantageously accommodate various chartplotter 231 brands or configurations with varying widths. The gimbal arms 241 may also be adjustable along the direction of lift, if desired, as noted above.

Seal strips 244 (see FIG. 7) or a gasket may optionally be used under the boat console panel 232 (or carried on the mounting plate 240) so that when the mounting plate is fully lifted the seals are compressed to form both a water-tight interface and a more solid, stiff mounting surface for the gimbal arms 241. Seal strips 244 may also be positioned on the front surface of the boat console panel 232 under the interface of the chartplotter 231 (or on the back side of the chartplotter) to form a seal between the boat console panel and chartplotter when the chartplotter is in the stowed/flush position.

The enclosure/frame 235 mounts to the underside of the boat console panel 232 using screws or other suitable attachment device(s). It should be noted that the location of the threaded rod 239 shown in FIG. 6 allows the gear motor 238 to remain stationary relative to the lift 260. In an alternative embodiment of the scissor lift 260', the threaded rod 239' may be oriented along the direction of travel of the scissor lift. In this case the gear motor 238' would move rather than remain stationary in order to maintain its alignment with the scissor lift mechanism 260'. The threaded rod 239' incorporates both a left-hand and right-hand thread in order to pull together (lifting mode) or push apart (lowering mode) the two cross bars 263' as shown. In such a configuration, the motor 238' may travel in a well-lubricated slide bearing (not shown), which may be mounted to the exterior of the enclosure, for example.

Figure 10:
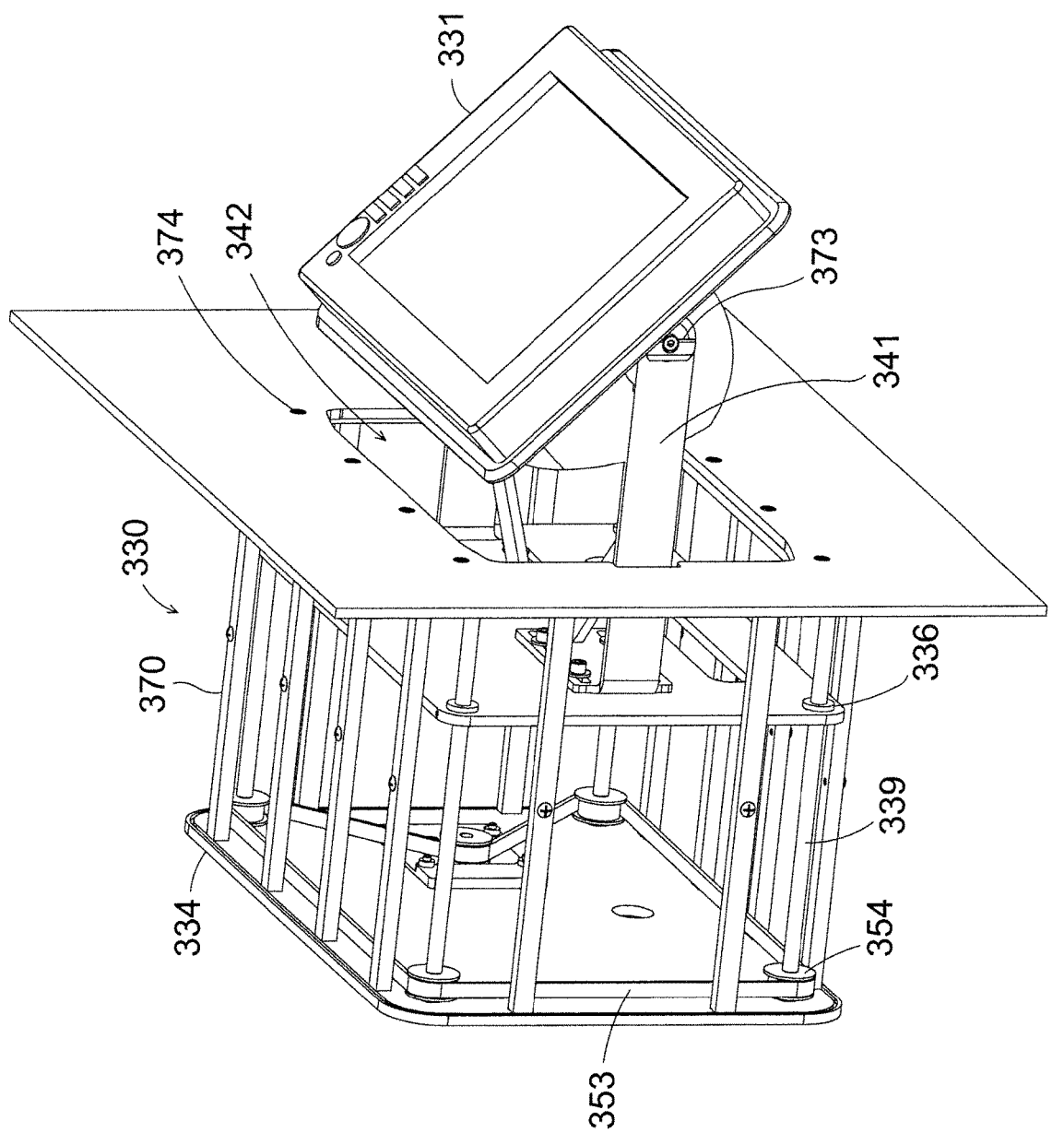
FIG. 10 is a perspective view of an alternative arrangement of the belt-driven mounting platform of FIG. 4 from the front in an extended position.
Figure 11:
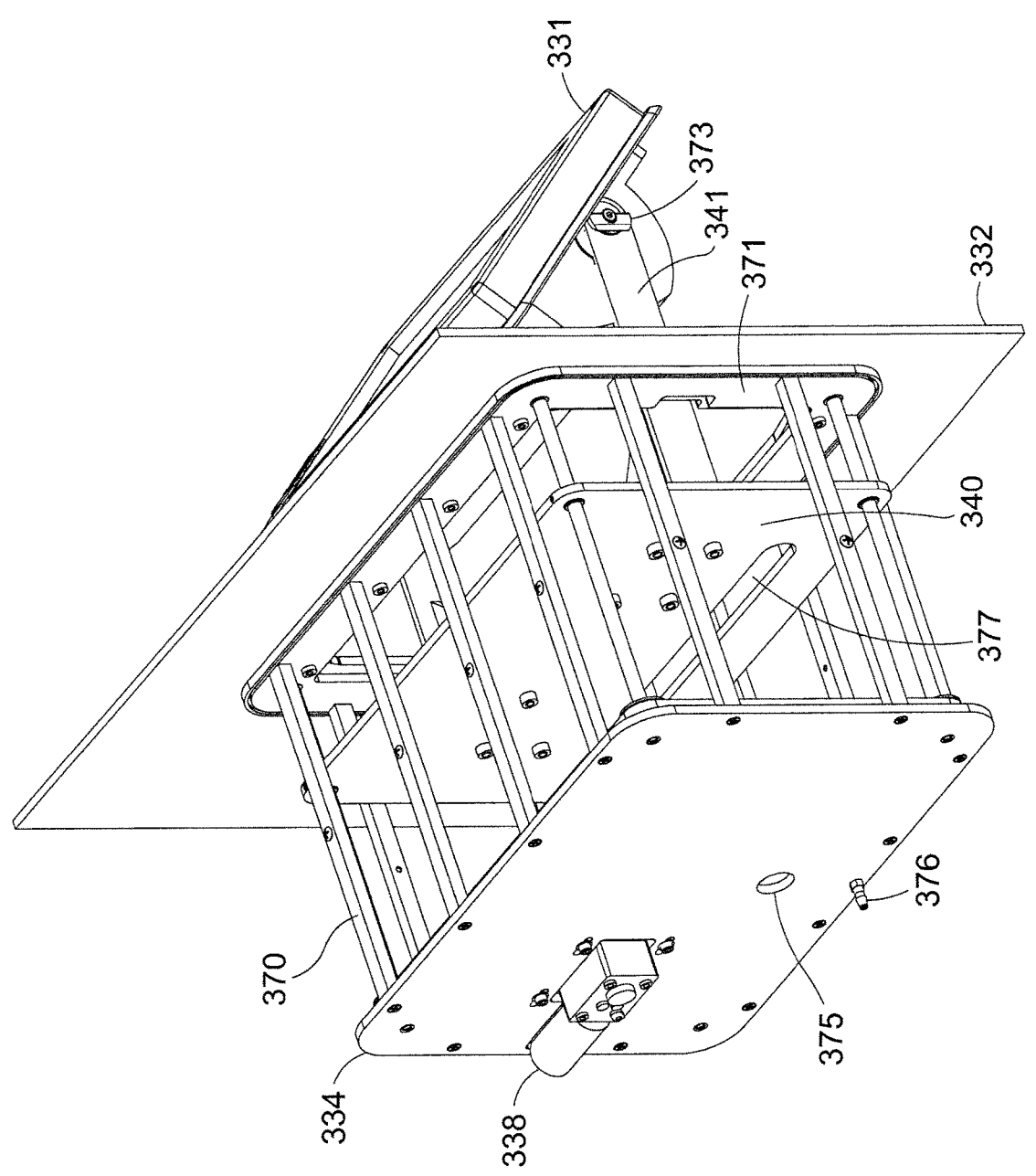
FIG. 11 is a perspective view of the mounting platform of FIG. 10 from the rear.

Turning to FIGS. 10 and 11, an alternative implementation of the belt-driven mounting platform 130 discussed above is now described. The illustrated mounting platform 330 also is similarly configured to lift a chartplotter 330 (or other electronic devices) from a flush position, relative to the front of the boat console panel 132', to an extended position where it can be rotated or pivoted as shown. A plurality of standoffs or struts 370 connect a lower bearing plate 334 to an upper bearing plate 371, which is connected to the boat console panel 332 with screws 374 and surrounds the opening 342 therein. In some embodiments, an enclosure similar to the one shown in FIG. 3 may be used to cover the mounting platform 330 within the boat console, if desired.

The present belt-driven, four-lead-screw lift configuration operates as follows. The gear motor 338 rotates a pulley 352. The pulley 352 moves a belt 353 that interfaces with four other pulleys 354 that are each fastened to a respective lead screw 339. As the gear motor 338 rotates, the four lead screws 339 rotate in four lead screw nuts 336 and exert a force on the mount or lift plate 340 lifting it or lowering it, depending on the direction of rotation of the gear motor. Gimbal arms 341 are attached to the mounting plate 340, and the chartplotter 331 is constrained to the gimbal arms in the example configuration by folding wing screws 373 (although adjustment knobs may also be used in some embodiments as discussed above). Once the chartplotter 331 is extended, the folding wing screws 373 can be loosened to allow the chartplotter to be rotationally adjusted or pivoted to a desired viewing angle as shown.

The gimbal arms 341 are slotted at their base and are side-to-side adjustable. That is, the gimbal arms 341 are free to move side-to-side until the screws are securely tightened at their base. Again, this accommodates for various chartplotter 331 brands or configurations with different shapes and widths. The gimbal arms 341 may also be adjustable along the direction of lift, if desired. Although not shown, seals or gaskets may be incorporated between the mounting plate 340 and the upper bearing plate 371, and/or between the chartplotter 331 and the front side of the boat console panel 332 as described above, if desired.

In the illustrated example, the lower bearing plate 334 also illustratively includes an opening 375 for one or more cables, e.g., sonar cables, power cables, network cables (e.g., NMEA 2000), etc., etc. The lower bearing plate 334 also illustratively includes a drain nozzle 376 for draining any accumulated moisture. Furthermore, the mounting or lift plate 340 also illustratively includes a slot 377 for the cables to pass through to the back of the chartplotter 331.

Figure 12:
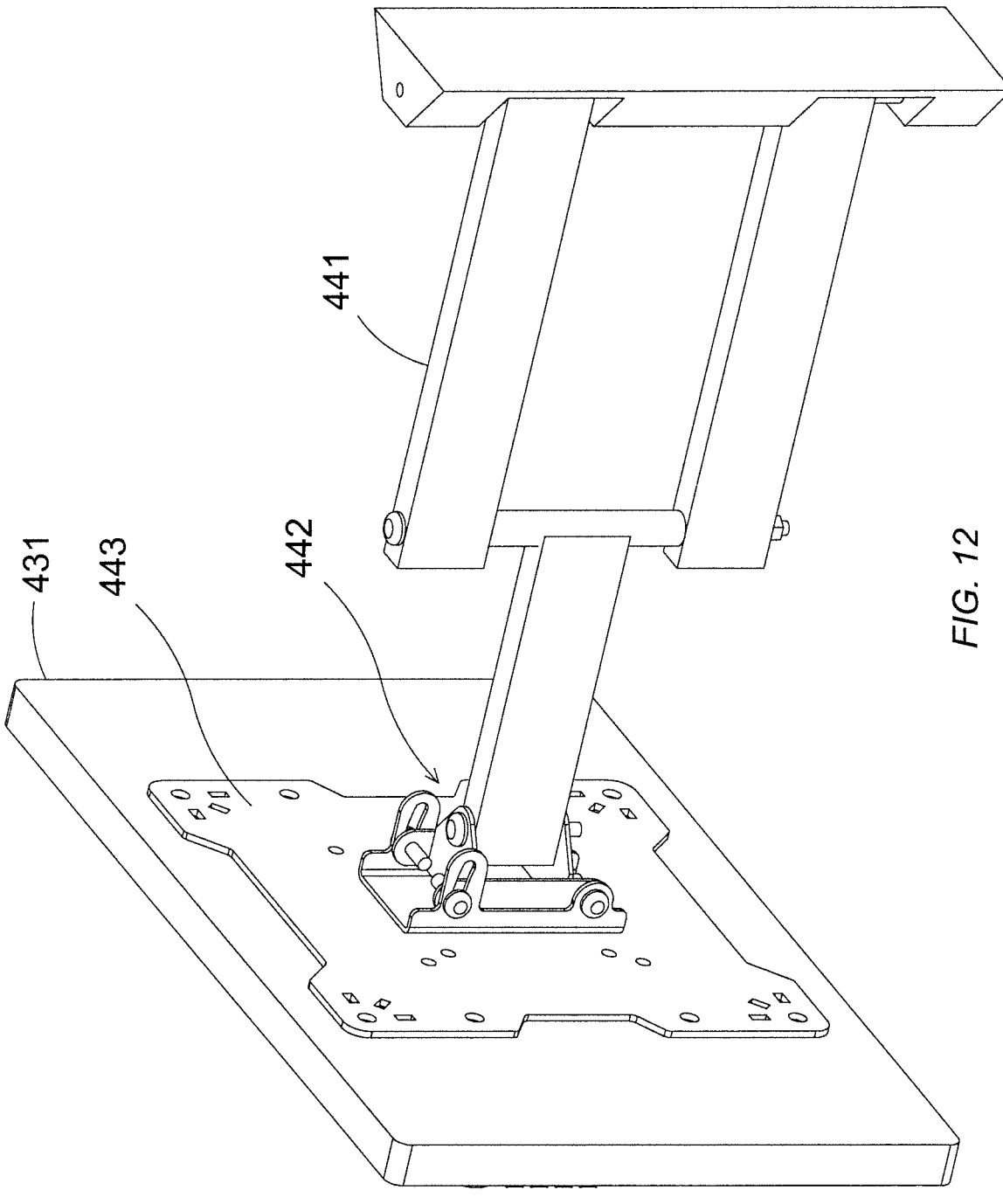
FIG. 12 is a perspective view of a universal (VESA) mount configuration which may be used with different embodiments of the mounting platforms set forth herein.

Referring additionally to FIG. 12, a universal or VESA mounting bracket 443 for a chartplotter 431 is now described. An articulating arm 441 is carried by a mounting plate (not shown), similar to the gimbal arms described above. However, the arm 441 terminates in a swivel mount 442 which carries the VESA mounting bracket 443. Other mounts are also possible, such as a ball mount, for example. As will be appreciated by the skilled artisan, the VESA mounting bracket 443 has holes positioned at standardized distances or positions, and the manufacturers of various types of monitors locate corresponding mounting holes at the same positions to provide universal interoperability between different types of monitors and VESA mounts. Generally speaking, with respect to marine electronic devices, smaller units (e.g., less than sixteen inches) typically are configured to be mounted on gimbal arms, whereas larger units (e.g., greater than or equal to sixteen inches) are configured to work with VESA mounts, so the type of bracket to be used in a given installation may advantageously be selected based upon the unit being installed. It should be noted that gimbal and VESA mounts are but two examples of mounts that could be used with the mounting brackets set forth herein, and that other suitable brackets may be used in different embodiments.

Many modifications and other embodiments of the invention will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included.

That which is claimed is:

1. A boat console comprising:
   a boat console body to be mounted within a boat, the boat console body defining a boat console panel having a mounting hole therein;
   a marine electronics unit having a screen; and
   an electronics mounting platform comprising
   a base connected to a back side of the boat console panel and aligned with the mounting hole,
   an actuator connected to the base,
   a mounting plate having a first side connected to the actuator, and a second side opposite the first side, and
   at least one pivot mount connected to the second side of the mounting plate and to the marine electronics unit;
   wherein the actuator is configured to move the mounting plate between a stowed position where the marine electronics unit is recessed within the mounting hole with the screen viewable at a fixed viewing angle, and an extended position in which the marine electronics unit is spaced apart from the front side of the boat console panel and pivotable using the at least one pivot mount to orient the screen at different viewing angles.

2. The boat console of claim 1 wherein the base comprises an enclosure including a bottom and a plurality of sidewalls extending from the bottom to be connected to the back side of the boat console panel around the mounting hole.

3. The boat console of claim 1 wherein the base comprises a bearing plate; and wherein the electronics mounting platform further comprises a plurality of standoffs configured to connect the bearing plate to the back side of the boat console panel around the mounting hole.

4. The boat console panel of claim 3 wherein the bearing plate comprises a lower bearing plate, and the electronics mounting platform further comprises an upper bearing plate connected between the back side of the boat console panel and the plurality of standoffs.

5. The boat console of claim 1 wherein the at least one pivot mount comprises a pair of spaced apart gimbal arms.

6. The boat console of claim 1 wherein the at least one pivot mount comprises a VESA mount.

7. The boat console of claim 1 wherein the actuator comprises at least one lead screw connected between the base and a lead screw nut carried by the mounting plate, and a motor carried by the base and configured to rotate the at least one lead screw to move the mounting plate between the stowed position and the extended position.

8. The boat console of claim 7 wherein the at least one lead screw comprises a plurality of spaced apart lead screws connected between the base and respective lead screw nuts carried by the mounting plate; wherein the electronics mounting platform further comprising a belt connected between the motor and the lead screws; and wherein the motor is configured to turn the belt to simultaneously rotate the lead screws.

9. The boat console of claim 1 wherein the actuator comprises at least one lead screw connected between the mounting plate and a lead screw nut carried by the base, and a motor carried by the mounting plate and configured to rotate the at least one lead screw to move the mounting plate between the stowed position and the extended position.

10. The boat console of claim 1 wherein the actuator comprises a scissor lift connected between the base and the mounting plate.

11. A boat console comprising:
   a boat console body to be mounted within a boat, the boat console body defining a boat console panel having a mounting hole therein;
   a marine electronics unit having a screen; and
   an electronics mounting platform comprising
   a bearing plate connected to a back side of the boat console panel and aligned with the mounting hole,
   a plurality of standoffs connected between the bearing plate and the back side of the boat console panel around the mounting hole,
   an actuator connected to the bearing plate,
   a mounting plate having a first side connected to the actuator, and a second side opposite the first side, and
   a pair of spaced apart gimbal arms connected to the second side of the mounting plate and to the marine electronics unit;
   wherein the actuator is configured to move the mounting plate between a stowed position where the marine electronics unit is recessed within the mounting hole with the screen viewable at a fixed viewing angle, and
   an extended position in which the marine electronics unit is spaced apart from the front side of the boat console panel and pivotable using the pair of spaced apart gimbal arms to orient the screen at different viewing angles.

12. The boat console panel of claim 10 wherein the bearing plate comprises a lower bearing plate, and wherein the electronics mounting platform further comprises an upper bearing plate connected between the back side of the boat console panel and the plurality of standoffs.

13. A boat console comprising:

a boat console body to be mounted within a boat, the boat console body defining a boat console panel having a mounting hole therein;

a marine electronics unit having a screen; and an electronics mounting platform comprising a base connected to a back side of the boat console panel and aligned with the mounting hole, a mounting plate having a first side and a second side opposite the first side, at least one lead screw nut carried by the mounting plate, at least one lead screw connected between the base and the at least one lead screw nut, a pair of spaced apart gimbal arms connected to the second side of the mounting plate and to the marine electronics unit, and a motor carried by the base and configured to rotate the at least one lead screw to move the mounting plate between a stowed position where the marine electronics unit is recessed within the mounting hole with the screen viewable at a fixed viewing angle, and an extended position in which the marine electronics unit is spaced apart from the front side of the boat console panel and pivotable using the pair of spaced apart gimbal arms to orient the screen at different viewing angles.

14. The boat console of claim 13 wherein the base comprises an enclosure including a bottom carrying the lead screw nut and a plurality of sidewalls extending from the bottom to be connected to the back side of the boat console panel around the mounting hole.

15. The boat console of claim 13 wherein the at least one lead screw nut comprises a plurality thereof, and the at least one lead screw comprises a plurality of spaced apart lead screws connected between the base and respective lead screw nuts carried by the mounting plate; wherein the electronics mounting platform further comprises a belt connected between the motor and the lead screws; and wherein the motor is configured to turn the belt to simultaneously rotate the lead screws.

* * * * *